United States Patent [19]

Carroll

[11] Patent Number: 4,795,884
[45] Date of Patent: Jan. 3, 1989

[54] METHOD FOR IN-SITU RESTORATION OF PLANTINUM RESISTANCE THERMOMETER CALIBRATION

[75] Inventor: Radford M. Carroll, Oak Ridge, Tenn.

[73] Assignee: The United States of America as represented by the United States Department of Energy, Washington, D.C.

[21] Appl. No.: 111,489

[22] Filed: Oct. 23, 1987

[51] Int. Cl.[4] ............................................. H05B 1/02
[52] U.S. Cl. ................................. 219/497; 219/494; 219/505; 219/492; 374/183; 374/185; 374/1; 324/63
[58] Field of Search ..................... 374/185, 183.3, 163, 374/164, 1; 324/63; 219/494, 501, 504, 505, 497, 499, 506, 492, 493, 490, 491

[56] References Cited

U.S. PATENT DOCUMENTS

| | | | |
|---|---|---|---|
| 3,613,454 | 10/1971 | McFadin | 374/185 |
| 3,662,151 | 5/1972 | Haffey | 219/240 |
| 4,080,564 | 3/1978 | Nitta et al. | 219/10.55 B |
| 4,198,676 | 4/1980 | Varnum et al. | 374/185 |
| 4,436,438 | 3/1984 | Voznick | 374/185 |
| 4,501,147 | 2/1985 | Niwa | 219/10.55 B |
| 4,638,960 | 1/1987 | Staube et al. | 219/497 |

Primary Examiner—M. H. Paschall
Attorney, Agent, or Firm—David E. Breeden; Stephen D. Hamel; Judson R. Hightower

[57] ABSTRACT

A method is provided for in-situ restoration of platinum resistance thermometers (PRT's) that have undergone surface oxide contamination and/or strain-related damage causing decalibration. The method, which may be automated using a programmed computer control arrangement, consists of applying a dc heating current to the resistive sensing element of the PRT of sufficient magnitude to heat the element to an annealing temperature and maintaining the temperature for a specified period to restore the element to a stress-free calibration condition. The process anneals the sensing element of the PRT without subjecting the entire PRT assembly to the annealing temperature and may be used in the periodic maintenance of installed PRT's.

4 Claims, 1 Drawing Sheet

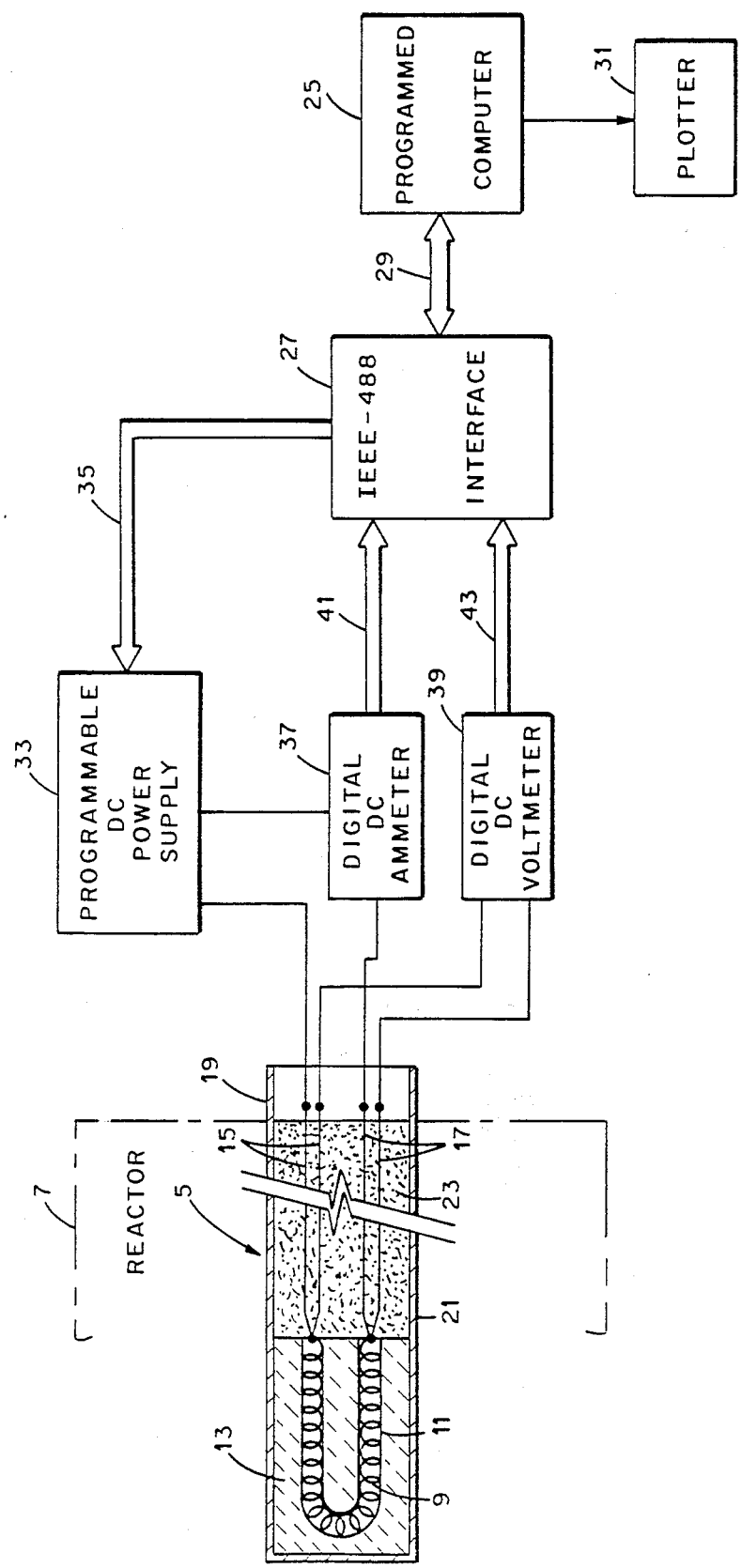

METHOD FOR IN-SITU RESTORATION OF PLANTINUM RESISTANCE THERMOMETER CALIBRATION

BACKGROUND OF THE INVENTION

This invention relates generally to the art of platinum resistance thermometers and more specifically to methods of maintaining the accuracy of platinum resistance thermometers used in critical temperature measuring applications.

Platinum resistance thermometers (PRT's) are used extensively in scientific and industrial applications when very precise temperature measurements are required. The measurement method depends on an established relationship between the electrical resistance of a very pure, annealed, platinum resistance element and the element's temperature. If the sensing element of the PRT becomes chemically contaminated or strained or work hardened due to differential expansion induced by abnormal temperature transients or by vibrations, the PRT becomes decalibrated. The PRT must be removed and replaced or recalibrated, both of which are expensive operations. Further, the user is normally not aware that decalibration has occured.

In nuclear reactor temperature measuring applications, for example, PRT's are used in which the sensitive platinum resistor element is formed by helically winding a length of platinum resistor wire which is then annealed in an annealing furnace and inserted in a loose fit arrangement into a U-shaped, circular cross-section channel of a ceramic insulator. A pair of low resistance platinum wires are then attached to each end of the resistor coil which extend through a long metal sheath packed with insulating material to an accessable terminal box located outside the reactor core for connection to appropriate instrumentation. These PRT's are precisely calibrated for temperature measurements over a range of typically 020 C. to 350° C. at accuracies within ±0.07° C. When these PRT's become decalibrated it is the usual practice to remove the device and replace it with a new or recalibrated PRT. This operation requires that the reactor be shutdown for removal of the PRT and subsequent decontamination of the removed device. This is a very expensive and time consuming process.

Thus, there is a need for a process which would allow in situ restoration of platinum resistance thermometers to their original calibration to reduce maintenance cost and lost production time for processes using these thermometers.

SUMMARY OF THE INVENTION

In view of the above need, it is an object of this invention to provide a method for in situ restoration of platinum resistance thermometers to their original calibration which have become decalibrated due to surface oxidation or strain-related damage.

Further, it is an object to provide a method as in the above object wherein the in situ restoration is achieved by heating the platinum resistance sensing element of the thermometer to remove surface oxide films as well as stresses due to strain-related damage.

Other objects and many of the attendent advantages of the present invention will be apparent to those skilled in the art from the following detailed description of the method of this invention.

In summary, the invention is a method for in-situ restoration of platinum resistance thermometers to their original calibration condition following formation of a surface oxide film and/or strain-related damage by annealing the platinum resistor sensing element of the thermometer. A dc current from a voltage controlled power supply is applied to the platinum resistor through existing leads to gradually increase the current flow through the resistor and so increase the resistor temperature while monitoring the resistance of the platinum resistor. When the monitored resistance reaches an elevated value corresponding to a selected temperature range for the platinum resistor element, the voltage of the power supply is then controlled to maintain the elevated resistance constant thereby maintaining a constant temperature for a selected time period sufficient to decompose the oxide film and anneal the platinum resistor element. At the end of the heating period, the voltage is gradually reduced, thereby gradually reducing the heating current through the platinum resistor element so that the temperature of the element is gradually lowered to near ambient conditions to prevent thermal stressing. With this in situ-method, it has been found that PRT's with surface oxide films and/or strain-related damage can be restored to the original calibration without any damage to the thermometer assembly.

BRIEF DESCRIPTION OF THE DRAWING

The single FIGURE is a schematic diagram of a system for automatically performing the method of restoring a PRT according to the method of this invention.

DETAILED DESCRIPTION

In developing the method of this invention, two PRT's suspected of being decalibrated were removed from a nuclear reactor after being used for three years. These PRT's were determined to be out of calibration by at least 4.5° F. at 900° F. These PRT's were annealed in an annealing furnace for 24 hours at 1112° F. (600° C.). Subsequent testing revealed that the devices had been restored by the annealing process to their original stress-free calibration.

Another PRT, rated at 100 ohms at 0° C., was annealed while it was immersed in ice water according to the method of this invention using a 155 volt variable dc voltage power supply connected to one pair of the PRT's terminal leads to apply a dc voltage across the platinum resistor sensing element of the PRT. An ammeter was connected in series with one of the power supply leads to measure the dc current applied to the resistor. A volt meter was connected to a second pair of the PRT's terminal leads to measure the voltage across the platinum resistor sensing element. Following, the connections of the equipment, the power supply voltage was gradually raised in steps of about 10 volts/step and the resistance of the platinum resistance element was calculated for each voltage step using the voltage and current measurements obtained at each step. When the calculated resistance reached about 320 ohms (corresponding to a voltage of 140V and a heating current of 0.437 A), indicating that the platinum resistor sensing element was at a temperature of about 600° C., the power supply voltage was regulated manually to maintain the 600° C. temperature for about 15 minutes. The purpose of this test was to demonstrate that the internal heating would not cause unacceptable differential expansion stress with the element at 600° C. and the sheath at 0° C. It is well established that the platinum element will anneal at 600° C. and the oxide layer will decompose. Subsequent testing of this PRT revealed that the platinum resistor sensing element had the same ice point resistance as the original stress-free calibrated condition, demonstrating that internal heating did not cause stress damage. Since the resistance of the sensing element is large compared to the low resistance lead wires, no other components of the PRT is heated significantly during this annealing process, and the annealing can be carried out while the PRT remains in situ. This enables the annealing and oxide surface film removal from PRTs that have sheaths or other components that cannot withstand a 600° C. furnace anneal.

Accordingly, an automated PRT restoration method has been developed which is carried out using a programmed computer as illustrated schematically in the drawing for reconditioning a PRT 5 mounted in a nuclear reactor 7. The PRT 5 includes a wound platinum resistor sensing element 9 disposed in a U-shaped channel 11 of a ceramic insulator block 13. Each end of the sensing element 9 is connected to platinum lead wires (15 and 17) which extend to a terminal block 19 located outside of the reactor containment. The whole PRT assembly is housed in a metal tube sheath 21 and an insulation material 23 is packed around the leads inside the tube to electrically and thermally insulate the lead wires.

In order to automate the method as described above to anneal the sensing element of a PRT in situ as shown in the drawing, a programmed computer 25 is used to automatically control the process. The preferred computer is a Macintosh Plus computer equipped with a hard drive and an IEEE-488 interface 27 connected to the computer 29. An optional plotter 31 may be connected to the computer 25 to provide a hard copy record of the annealing process if desired. The interface 27 is connected to the digital control input of a programmable dc power supply 33, such as the model ATE-325-0.8M supplied by KEPCO, Corp., Flushing, New York. This type of power supply provides a variable dc output voltage over the range of from 0–325 Volts corresponding to an appropriate range of 8-bit digital signals supplied over a bus 35 connecting the interface 27 to the power supply 33. The output of the power supply is connected across the platinum resistor sensing element 9 of the PRT 5 by connecting one lead of the power supply to a terminal in the terminal box 15 connected to one of the leads 15 and connecting the other lead of the power supply through an ammeter 37 to one of the terminals connected to a lead 17 of the PRT. A voltmeter 39 is connected to measure the actual voltage drop across the sensing element 9 by connecting one input to a lead 15 terminal and the other input to a lead 17 terminal as shown in the drawing. The ammeter 37 and voltmeter 39 are conventional digital instruments which provide 8 bit digital outputs with appropriate hand-shake capability for IEEE-488 interface applications. For example, both instruments may be identical digital multimeters such as the model 3468A/B, supplied by Hewlett Packard Corp., Loveland, Colo. These instruments are switch selected for use as a dc ammeter or dc voltmeter. These instruments provide constant analog-to-digital conversion of the selected measurement and provides the digital signals at an output thereof which may be connected to the interface 27 via appropriate 8-bit bus connections, such as the bus connections 41 and 43 connected between meters 37 and 39, respectively, and separate inputs of the interface 27.

In operation, the computer may be programmed using a software package called LabVIEW, an instrumentation control software package available from National Instruments Corp., Austin, Tex. This software provides the capability of creating a resident program, which can be stored on the computer hard drive, that automatically performs the in-situ PRT restoration annealing process with minimum operator input to start a test procedure. Once the program is stored on the computer hard drive, a technician may then take the computer and instruments to the site, connect the equipment as outlined above, and perform the PRT restoration. The stored program provides operator inputs only for the serial number of the PRT, the type of PRT (a 100 ohm or 200 ohm type), and the operators name. Various checks may be programmed into the computer to prevent damage to the PRT. For example, the program will not allow the test to be run if the measured resistance is not consistant with the selected type PRT entered by the operator or if various predefined alarm conditions exist during the process.

In the process of initializing the resident program, the program is designed to control the power supply 33 to apply a voltage across the sensing element 9 of the PRT at a selected ramp-up rate, typically 10 V/min, while constantly monitoring the ammeter 37 output, which measures the heating current through the element, and the voltmeter 39 output, which measures the actual voltage drop across the element. These values are used to calculate the temperature of the sensing element using the formulas supplied with a PRT to determine the element temperatures based on the element resistance. Once the voltage of the power supply is raised to a value which produces a heating current through the sensing element corresponding to the selected annealing of approximately 600° C. where both oxide film removal and annealing will occur, the program regulates the power supply voltage to maintain the temperature for a programmed dwell time, typically in the range of 10–20 minutes. Following the selected dwell time, the program is set to decrease the voltage of the power supply at a selected ramp-down rate, which may be the same as the ramp-up rate, so that the element temperature is gradually decreased. Following the ramp-down, the program automatically terminates and appropriately instructs the operator that a successful annealing restoration process has been completed.

During the automated process, the program displays the measured voltage and current, the calculated element temperature, ramp-rates and dwell-time. Further, these values may be continually plotted on the plotter 31 or stored in a file for subsequent print out or transfer to other magnetic memory systems for record keeping.

Various alarm conditions may be specified in the program to stop the annealing process if certain values are exceeded. Since industrial PRT's usually have either 100 or 200 ohm resistance at 0° C., the program may be designed to calculate the resistance using the voltage and current measurements. If the PRT leads are not connected properly, so that the resistance is less than 100 ohms for a 100 ohm type PRT or 200 ohms for a 200 ohm type PRT, as selected by the operator, the program is interrupted and the operator is so notified. Further, when the resistance of a 100 ohm type PRT is 320 ohms and the resistance of a 200 ohm type PRT is 640 ohms, the temperature is 615° C.±5° C. Thus, the program may be designed to provide an alarm condition if the calculated resistance exceeds these values during an annealing process and terminate the program.

Since the temperature of the sensing element of the PRT is monitored independently of any changes in the surrounding temperature by regulating the power supply voltage during the dwell period, this method is preferred to furnace annealing which requires the entire PRT assembly to be heated to 600° C., or higher. Thus, a furnace anneal to remove oxide surface layers and strain-related decalibration may require the PRT assembly to be raised to a temperature higher than the sheath is rated for some PRT's. With this method only the platinum resistor sensing element 9 reaches the 600° C. annealing temperature. Depending on the heat transfer of the system, the sheath 21 temperature may be only slightly higher than the process system where the PRT is installed. Thus, this process will not only anneal damage faster and cheaper than removing the PRT from the process environment for a furnace anneal, but it will also be applicable to some PRT's that cannot be furnace annealed.

Although the invention has been illustrated by means of a specific example, it will be obvious to those skilled in the art that various modifications and changes may be made in the process without departing from the spirit and scope of the claims attached to and forming a part of this specification. For example, the specific annealing temperature and time specified has been found to restore the sensing element to a stress-free calibration condition, it is likely that additional research will provide an optimum time-temperature anneal which may be used in the process.

I claim:

1. A method for the in situ restoration of a platinum resistance thermometer, which has become decalibrated due to oxide surface film formation and/or strain-related damage, to a stress-free calibration condition wherein said thermometer includes a platinum resistor sensing element whose resistance varies with the temperature of said element in accordance with a known relationship comprising the step of:

passing a controlled dc current through said platinum resistor sensing element, said current having a magnitude sufficient to raise the temperature of said element to its oxide decomposition and annealing temperature and said current being maintained for a heating period sufficient to restore said element to an oxide free surface and stress-free calibration condition.

2. The method as set forth in claim 1 wherein the step of passing a controlled dc current through said platinum resistor sensing element further includes the simultaneous steps of measuring said dc current passing through said element and the voltage drop across said element, calculating the resistance of said element from the current and voltage measurements of said current and voltage measuring steps as an indication of the temperature of said element and varying the current passing through said element to maintain a substantially constant resistance during said heating period, thereby maintaining a substantially constant annealing temperature during said heating period.

3. The method as set forth in claim 2 wherein said step of passing a controlled dc current through said platinum resistor sensing element further includes providing a variable voltage dc power supply connected to said sensing element to supply said dc current through said element, gradually increasing the voltage output of said power supply at a selected rate to gradually increase said current through said element until said element reaches said annealing temperature, controlling said voltage during said heating period to maintain said annealing temperature substantially constant and gradually reducing said voltage output of said power supply following said heating period at a selected rate to gradually decrease the temperature of said element to prevent thermal stressing of said element following said heating period.

4. The method as set forth in claim 3 wherein said annealing temperature is about 600° C. and said heating period is the range of from 10 to 20 minutes.

* * * * *